(12) United States Patent
Kappich

(10) Patent No.: US 10,787,070 B2
(45) Date of Patent: Sep. 29, 2020

(54) ELECTRIC VEHICLE

(71) Applicant: Dr. Ing. h.c. F. Porsche Aktiengesellschaft, Stuttgart (DE)

(72) Inventor: Joachim Kappich, Weil der Stadt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/106,268

(22) Filed: Aug. 21, 2018

(65) Prior Publication Data
US 2019/0061506 A1    Feb. 28, 2019

(30) Foreign Application Priority Data
Aug. 22, 2017    (DE) .......................... 10 2017 119 132

(51) Int. Cl.
*B60K 1/04*     (2019.01)
*B62D 25/20*    (2006.01)
(Continued)

(52) U.S. Cl.
CPC ................ *B60K 1/04* (2013.01); *B60L 50/66* (2019.02); *B62D 25/20* (2013.01); *B62D 25/24* (2013.01); *B60K 2001/0438* (2013.01)

(58) Field of Classification Search
CPC .......... B60K 1/04; B62D 25/08; B62D 25/20; B62D 25/2027
(Continued)

(56) References Cited

U.S. PATENT DOCUMENTS

| 5,641,031 A | 6/1997 | Riemer et al. |
| 2003/0066694 A1 | 4/2003 | Mita et al. |

(Continued)

FOREIGN PATENT DOCUMENTS

| DE | 102008047345 A1 | 3/2009 |
| DE | 102011012496 A1 | 8/2012 |

(Continued)

OTHER PUBLICATIONS

Great Britain Search Report for Great Britain Application No. GB1813576.4, dated Jan. 31, 2019—2 pages.
(Continued)

*Primary Examiner* — Jason S Daniels
(74) *Attorney, Agent, or Firm* — RatnerPrestia

(57) ABSTRACT

An electric vehicle, having a floor assembly including lateral longitudinal carriers, front and rear crossmembers, a vehicle undertray which extends between the lateral longitudinal carriers and the crossmembers and a passenger compartment floor which extends above the vehicle undertray, a technical space between the passenger compartment floor and the vehicle undertray in a rear section of the floor assembly, in which rear section rear seats are mounted above the passenger compartment floor. Furthermore, the electric vehicle includes at least one electric machine and a traction battery arranged below the floor assembly and on the floor assembly. Starting from the passenger compartment floor, the rear crossmember extends as far as into the region of the vehicle undertray and closes the technical space at a rear end. The traction battery is mounted on the lateral longitudinal carriers and on the front and rear crossmembers, and is sealed circumferentially.

9 Claims, 2 Drawing Sheets

(51) Int. Cl.
*B60L 50/60* (2019.01)
*B62D 25/24* (2006.01)

(58) Field of Classification Search
USPC .......................................... 296/193.07, 204
See application file for complete search history.

(56) References Cited

U.S. PATENT DOCUMENTS

| | | |
|---|---|---|
| 2004/0062955 A1 | 4/2004 | Kubota et al. |
| 2014/0338999 A1* | 11/2014 | Fujii ........................ B60K 1/04 180/68.5 |
| 2016/0339812 A1 | 11/2016 | Mather |
| 2018/0075996 A1* | 3/2018 | Narisawa ................ B60K 1/04 |
| 2018/0111483 A1* | 4/2018 | Nakayama ............. B60K 1/04 |
| 2018/0126835 A1* | 5/2018 | Saeki .................... B62D 25/20 |
| 2019/0016391 A1* | 1/2019 | Inoue .................. B62D 21/155 |

FOREIGN PATENT DOCUMENTS

| | | |
|---|---|---|
| DE | 102017002249 A1 | 9/2018 |
| EP | 3412486 A1 | 12/2018 |
| FR | 2962376 A1 | 1/2012 |
| JP | H06344955 A | 12/1994 |
| JP | H07156826 A | 6/1995 |
| JP | 2005225451 A | 8/2005 |
| JP | 2013216183 A | 10/2013 |
| JP | 2014031168 A | 2/2014 |
| JP | 2015225451 A | 12/2015 |
| WO | 2013133152 A1 | 9/2013 |

OTHER PUBLICATIONS

Notice of Reasons for Refusal for Japanese Application No. 2018-154040, dated Jul. 31, 2019, with translation, 14 pages.
Korean Notice of Preliminary Rejection for Korean Application No. 10-2018-0095348, dated Apr. 8, 2020, 5 pages.

* cited by examiner

ELECTRIC VEHICLE

CROSS-REFERENCE TO RELATED APPLICATION

This application claims priority to German Patent application No, DE 10 2017 119 132.1, filed Aug. 22, 2017, which is incorporated by reference herein in its entirety.

FIELD OF THE INVENTION

The invention relates to an electric vehicle.

BACKGROUND OF THE INVENTION

Electric vehicles which are known from practice have a body structure, at least one electric machine for driving wheels of the electric vehicle, and a traction battery which provides drive energy for the or each electric machine.

The body structure of an electric vehicle has a floor assembly, the traction battery being arranged below the floor assembly of the body structure and being mounted on the floor assembly in the case of electric vehicles which are known from practice. As a result, the traction battery is readily accessible for service work.

The floor assembly of a body structure of an electric vehicle has lateral longitudinal carriers, front and rear crossmembers, and a vehicle undertray and a passenger compartment floor which extend in each case at least in sections between the longitudinal carriers and the crossmembers of the floor assembly. Here, the passenger compartment of the floor assembly is arranged above the vehicle undertray of said floor assembly, rear seats of the electric vehicle being mounted on the passenger compartment floor in a rear section of the floor assembly.

FR 2 962 376 A1, which is incorporated by reference herein, has disclosed a motor vehicle having a floor assembly and a traction battery which is arranged below the floor assembly. An electronic module which interacts with the traction battery is arranged in a technical space below the floor assembly, which technical space is open toward the rear.

DE 10 2011 012 496 A1, which is incorporated by reference herein, has disclosed a further electric vehicle. In accordance with this prior art, a floor assembly of a vehicle body comprises a vehicle floor and a passenger compartment floor. Furthermore, the floor assembly comprises crossmembers and longitudinal carriers. Battery packs of traction batteries are arranged in a technical space which is configured between the vehicle undertray and the passenger compartment floor.

SUMMARY OF THE INVENTION

It is an object of the invention to provide an electric vehicle which has improved acoustic properties with a satisfactory mounting capability at least of the traction battery and preferably of at least one electric machine.

Said object is achieved by a of an electric vehicle as claimed in claim 1.

According to aspects of the invention, starting from the passenger compartment floor, the rear crossmember extends as far as into the region of the vehicle undertray, and closes the technical space at a rear end. The traction battery is mounted on the lateral longitudinal carriers and on the front and rear crossmembers, and is sealed circumferentially.

In the case of the electric vehicle according to aspects of the invention, starting from the passenger compartment floor, the rear crossmember of the floor assembly is drawn or extended as far as into the, region of the vehicle undertray, and closes the technical space which is configured between the passenger compartment floor and the vehicle undertray, at a rear end. The traction battery is mounted on the lateral longitudinal carriers and on the front and rear crossmembers below the floor assembly and therefore below the vehicle undertray, and is sealed circumferentially thereon. As a result, an easy mounting capability of the traction battery can be ensured with improved acoustic properties.

The traction battery preferably has a battery frame and battery cells which are recessed from the battery frame, the battery frame being mounted on the lateral longitudinal carriers and on the front and rear crossmembers, and being sealed circumferentially. When the battery frame is mounted and sealed circumferentially on the longitudinal carriers and crossmembers, the traction battery can be mounted and dismantled particularly advantageously, to be precise with the provision of satisfactory acoustic properties of the electric vehicle.

In accordance with one advantageous development, a service flap is introduced into the passenger compartment floor, via which service flap the technical space is accessible, in which a battery connector unit for the traction battery is preferably positioned. At least one aperture is preferably made in the rear crossmember of the floor assembly, via which aperture lines are routed from the technical space to the or each electric machine which serves to drive rear wheels of the electric vehicle. Modules which are attached in the technical space, in particular the battery connector unit, are readily accessible.

In accordance with one advantageous development, the rear crossmember of the floor assembly is configured as an assembly bearing for at least one electric machine which serves to drive rear wheels. At least one carrying arm preferably acts with a first end on the rear crossmember, the respective carrying arm acting with a second end on the respective electric machine. This has the advantage that the or each electric machine which serves to drive rear wheels can also be mounted advantageously.

BRIEF DESCRIPTION OF THE DRAWINGS

Preferred developments of the invention result from the subclaims and the following description. Exemplary embodiments of the invention will be described in greater detail using the drawing, without being restricted thereto. In the drawings:

DETAILED DESCRIPTION OF THE INVENTION

Figure 1:
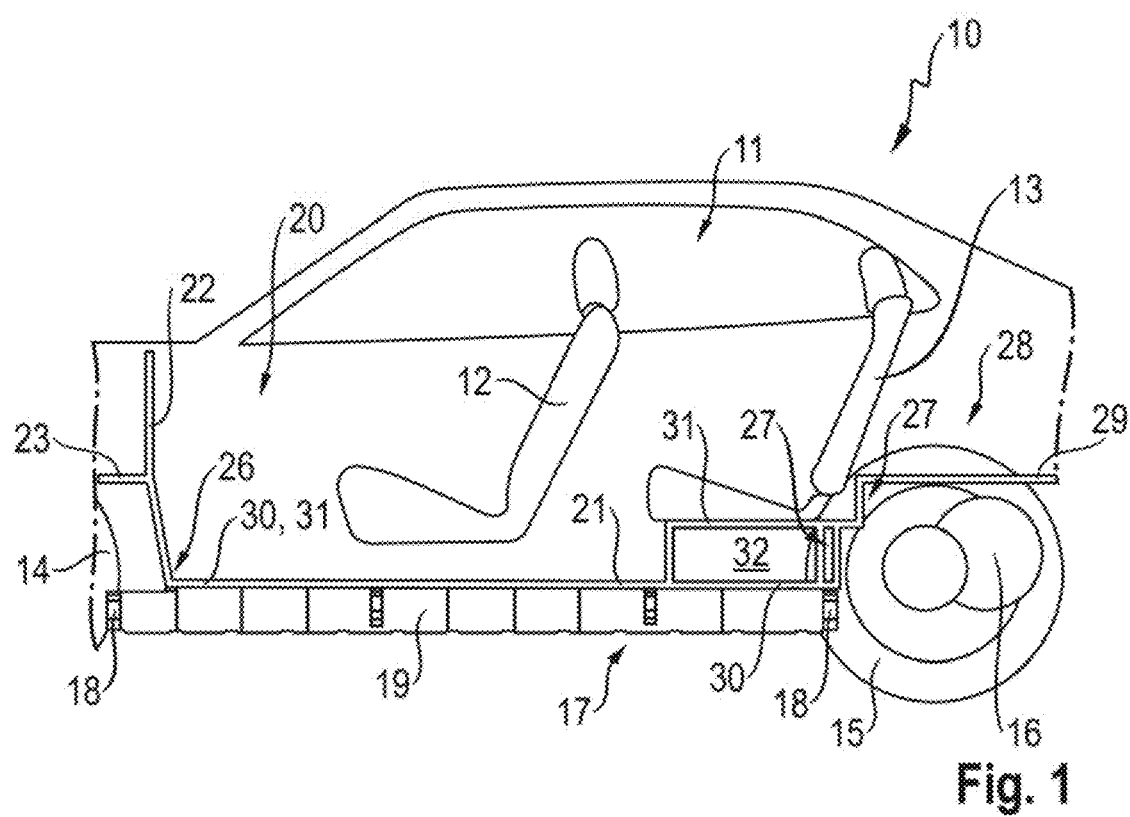
FIG. 1 shows a section from an electric vehicle according to aspects of the invention.

FIG. 1 shows a section from an electric vehicle 10 in the region of a passenger compartment 11 of the electric vehicle 10, front seats 12 firstly and rear seats 13 secondly being received in the passenger compartment 11.

The electric vehicle 10 has front wheels 14 and rear wheels 15, the front wheels 14 and/or the rear wheels 15 being driven by electric motor.

FIG. 1 shows an electric motor 16 which serves to drive the rear wheel 15 (shown in FIG. 1) of the electric vehicle 10.

Furthermore, the electric vehicle 10 has a traction battery 17 which serves to provide electric drive energy for the or each electric motor 16 of the electric vehicle 10. Here, the traction battery 17 has a battery frame 18 and battery cells 19 which are received by the battery frame 18.

The electric vehicle 10 has a body structure 20 FIG. 1 showing, of the body structure 20, a floor assembly 21 and an end wall 22 which delimits the passenger compartment 11 toward the front. The floor assembly 21 extends between the front wheels 14 and the rear wheels 15, the traction battery 17 being positioned below the floor assembly 21 and being connected below the floor assembly 21 to the latter.

Figure 2:
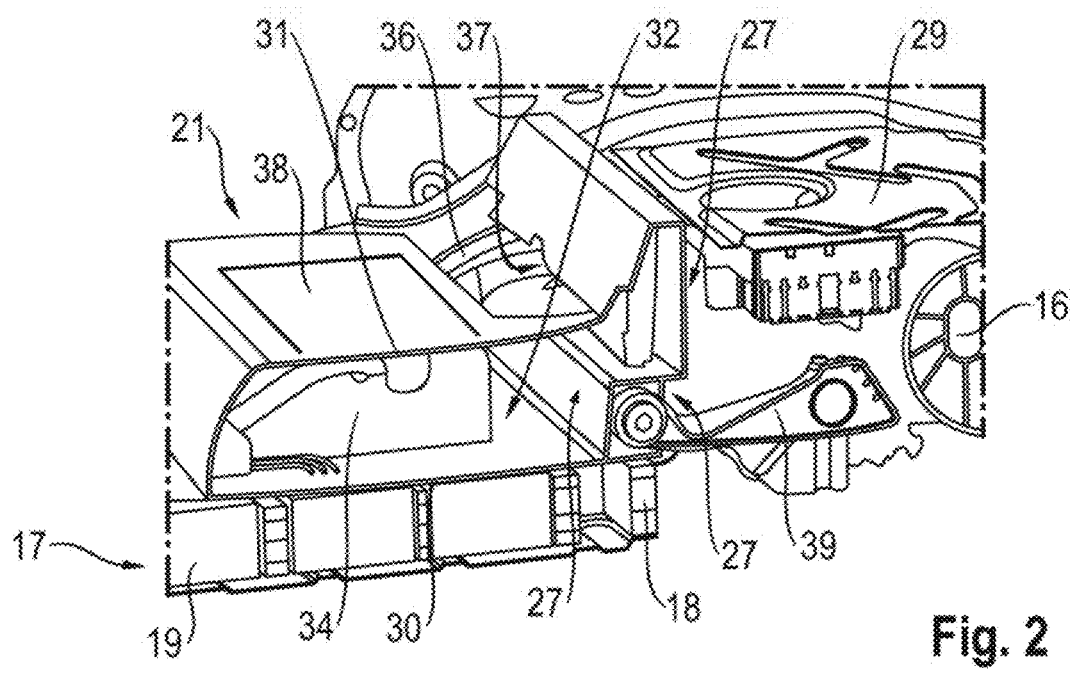
FIG. 2 shows a detail of the electric vehicle according to aspects of the invention.

FIG. 2 shows a section from the electric vehicle 10 in the region of a rear end of the floor assembly 21 and a rear end of the traction battery 17 which is mounted on the floor assembly 21, and an electric motor 16 which serves to drive the rear wheel 15 (shown in FIG. 1) of the electric vehicle 10.

It is to be noted that, starting from the end wall 22 of the body structure 20 which delimits the passenger compartment 11 toward the front, longitudinal carriers 23 extend toward the front, on which, in particular, suspension strut mounts for suspension struts which interact with the front wheels 14 are configured.

The floor assembly 21 has lateral longitudinal carriers 24, 25 and a front crossmember 26 and a rear crossmember 27. The lateral longitudinal carriers 24, 25 are preferably side sills. The front crossmember 26 is, in particular, a footwell crossmember which, as viewed in the vehicle longitudinal direction, extends adjacently with respect to the end wall 22 which extends the passenger compartment toward the front. The rear crossmember 27 extends, as viewed in the vehicle longitudinal direction, adjacently with respect to a rear wheel arch 28 and/or adjacently with respect to a C-piliar of the electric vehicle, a trunk floor 29 of the electric vehicle 10 extending toward the rear, as viewed from the rear crossmember 27.

Furthermore, the floor assembly of the electric vehicle 10 according to aspects of the invention has a vehicle undertray 30 which extends at least in sections between the longitudinal carriers 24, 25 and the crossmembers 26, 27, and a passenger compartment, floor 31 which likewise extends at least in sections between the longitudinal carriers 24, 25 and the crossmembers 26, 27 and is positioned above the vehicle undertray 30.

The spacing between the vehicle undertray 30 of the floor assembly 21 and the passenger compartment floor 31 of the floor assembly 21 varies, a relatively great spacing being configured between the vehicle undertray 30 and the passenger compartment floor 31 in a rear region of the floor assembly 21, in which rear region the rear seats 13 are mounted on the passenger compartment floor 31, with the configuration of a technical space 32.

Starting from the passenger compartment floor 31, the rear crossmember 27 of the floor assembly 21, from which rear crossmember 27 the trunk floor 29 extends toward the rear, extends as far as into the region of the vehicle undertray 30, and closes the technical space 32 at a rear end thereof. As a result, a closed technical space 32 is provided which provides satisfactory acoustic decoupling of the passenger compartment 11 from the or each electric machine 16 which serves to drive the rear wheels 16 of the electric vehicle 10.

The traction battery 17 which is positioned below the floor assembly 21 and is connected to the floor assembly 21 is connected circumferentially to the lateral longitudinal carriers 24, 25 and the crossmembers 26, 27, and is sealed circumferentially with respect to said 2S carriers 24, 25, 26 and 27.

Figure 3:
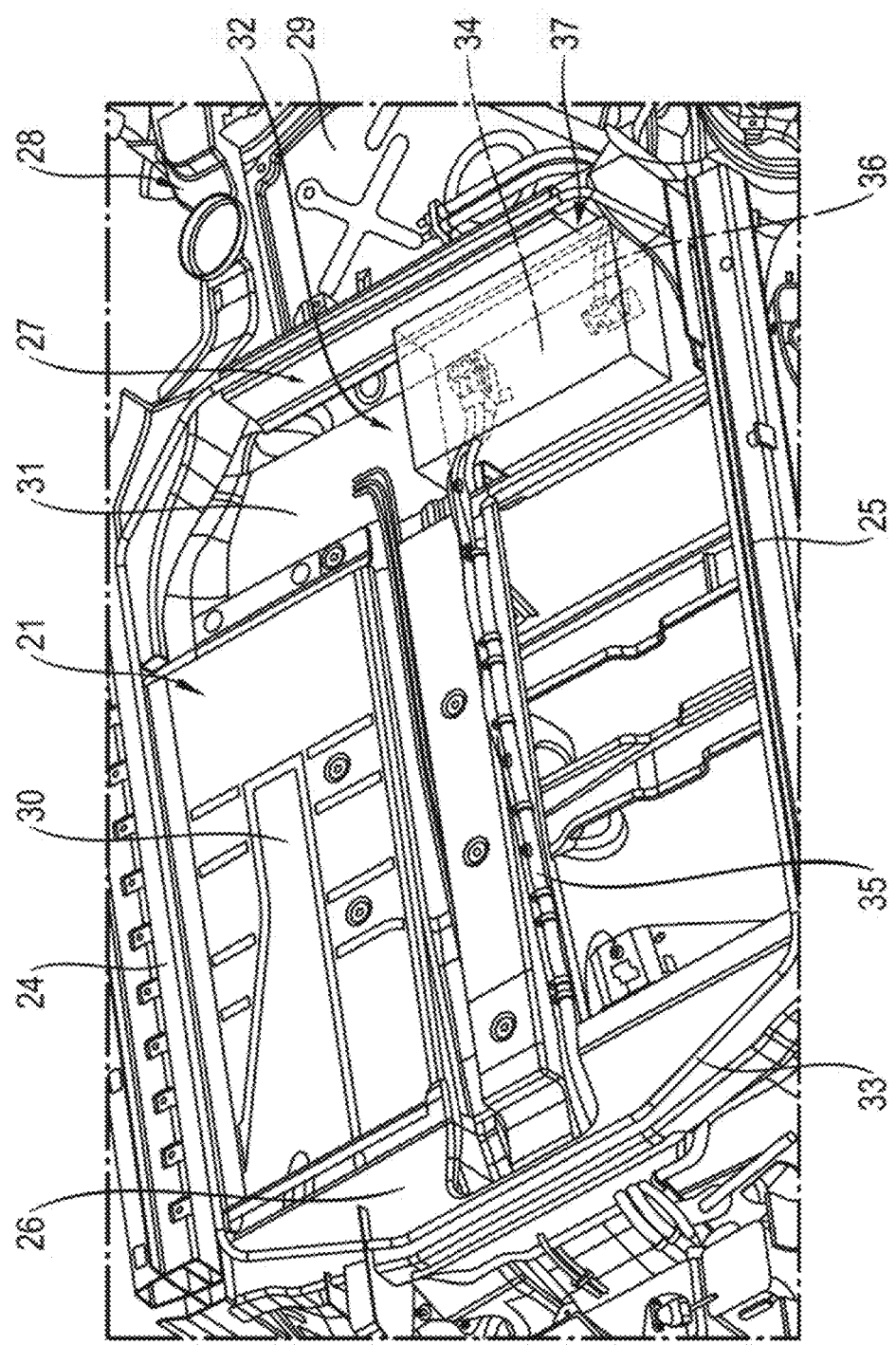
FIG. 3 shows a further detail of the electric vehicle according to aspects of the invention.

FIG. 3 which shows a view from below of the floor assembly 21 of the body structure 20 illustrates a circumferential seal 33 which extends along the two lateral longitudinal carriers 24, 25 and the crossmembers 26 and 27, and which serves to seal the traction battery 17 with respect to the floor assembly 21 in the mounted state, the battery frame 18 of the traction battery 17, which battery frame 18 likewise has frame sections which extend in the longitudinal direction and in the transverse direction, coming into contact, in particular, with said circumferential seal 33.

The traction battery 17 per se is not received in the technical space 32; rather, the technical space 32 serves to receive other modules, in particular to receive a battery connector unit 34 for the traction battery 17. The battery connector unit 34 serves to connect the traction battery 17 to the electric machines 16 which serve to drive the front wheels 14 and the rear wheels 16 of the electric vehicle. FIG. 3 thus shows that firstly lines 35 extend from the battery connector unit 34 toward the front in the direction of electric machines which serve to drive the front wheels 14 of the electric vehicle 10; secondly, electric lines 36 extend, starting from the battery connector unit 34, toward the rear in the direction of the or each electric machine 16 which serves to drive the rear wheels 15 of the electric vehicle. Here, at least one aperture 37 is made in the crossmember 27 which doses the technical space 32 at a rear end, in order to route the lines 36, which serve to connect the or each electric machine 16 which serves to drive the rear wheels 15 to the battery connector unit 34, out of the technical space 32 in the direction of the respective electric machine 16.

It can be gathered from FIGS. 1 and 2 that the crossmember 27 which doses the technical space 32 at a rear end can be of double-walled configuration at least in sections, in order to improve the acoustic decoupling of the or each electric machine 16 which serves to drive the rear wheels 15.

In accordance with FIG. 2, a service flap 38 is preferably introduced into the passenger compartment floor 31 which delimits the technical space 32 at the top in a manner which adjoins the passenger compartment 11, via which service flap 38 the technical space 32 is accessible, in order to make access possible, for example, to the battery connector unit 34 which is received in the technical space 32 in the case of installation work.

It is provided in accordance with one advantageous development of the invention that the rear crossmember 27 which closes off the technical space 32 at a rear region thereof is configured, furthermore, as an assembly bearing for the or each electric machine 16 which serves to drive the rear wheels 15. FIG. 2 thus shows that one end of a carrying arm 39 acts on the rear crossmember 27, in particular on a section thereof, in which said rear crossmember 27 is of double-walled configuration, the opposite end of said carrying arm 39 being attached to an electric machine 16 which serves to drive the rear wheel 15. As a result, electric machines 16 can be attached particularly advantageously to the body structure 20, namely to the floor assembly 21 in the region of the rear crossmember 27 thereof.

The electric vehicle 10 according to aspects of the invention allows an optimum attachment of the traction battery 17 and the electric machines 16 which serve to drive rear wheels 15 to the floor assembly 21 of the body structure of the electric vehicle 10.

Furthermore, satisfactory acoustic decoupling of the electric machines 16 from the passenger compartment 11 and, accordingly, satisfactory acoustic properties of the electric vehicle 10 are ensured.

The rear crossmember 27 of the floor assembly 21, which rear crossmember 27 extends in the region of a rear wheel arch 28 of the body structure 20, closes the technical space 32 at a rear end thereof, to be precise by virtue of the fact that said crossmember 27 extends as far as into the region of the vehicle undertray 30.

Here, the rear crossmember 27 of the floor assembly 21 serves not only to close the technical space 32, but rather, moreover, preferably also to attach the traction battery 27 and to attach the or each electric machine 16 which serves to drive the or each rear wheel 15 of the electric vehicle 10.

The attachment of the traction battery 17 to the floor assembly 21 is also circumferential in the region of the rear crossmember 27.

The attachment of the or each electric machine 16 which serves to drive the rear wheels 15 of the electric vehicle 10 takes place via carrying arms 39 to the rear crossmember 27, in particular in the region of a double-walled section of the rear crossmember 27.

What is claimed is:

1. An electric vehicle, having a floor assembly of a body structure of the electric vehicle, the floor assembly comprising:
    lateral longitudinal carriers,
    front and rear crossmembers,
    a vehicle undertray extending at least in sections between the lateral longitudinal carriers and the front and rear crossmembers,
    a passenger compartment floor extending above the vehicle undertray at least in sections between the longitudinal carriers and the front and rear crossmembers,
    a technical space positioned between the passenger compartment floor and the vehicle undertray in a rear section of the floor assembly, wherein rear seats are mounted on the passenger compartment floor,
    at least one electric motor for driving rear wheels of the electric vehicle,
    a traction battery which provides drive energy for the at least one electric motor, is arranged below the floor assembly of the body structure, and is mounted on the floor assembly,
    a battery connector unit positioned in the technical space, the battery connector unit interconnecting the traction battery to the at least one electric motor and another electric motor at a front end of the vehicle,
    wherein, starting from the passenger compartment floor, the rear crossmember extends as far as into the region of the vehicle undertray and closes the technical space at a rear end, and
    the traction battery is mounted on the lateral longitudinal carriers and on the front and rear crossmembers, and is sealed circumferentially,
    wherein the rear crossmember of the floor assembly is configured as an assembly bearing for at least one electric machine which serves to drive rear wheels of the electric vehicle, and the assembly bearing is located rearward of the technical space and over both the traction battery and the vehicle undertray.

2. The electric vehicle as claimed in claim 1, wherein at least one carrying arm acts with a first end on the rear crossmember, the respective at least one carrying arm acting with a second end on the respective at least one electric machine.

3. The electric vehicle as claimed in claim 2, wherein the rear crossmember is of double-walled configuration in a section, on which the respective carrying arm acts with the first end.

4. The electric vehicle as claimed in claim 1, wherein the front crossmember of the floor assembly is configured as a footwell crossmember which, as viewed in a longitudinal direction of the electric vehicle, extends adjacently with respect to an end wall of the body structure, which end wall of the body structure delimits the passenger compartment toward a front of the electric vehicle, and the floor assembly comprises further longitudinal carriers extending toward the front, as viewed from the end wall, to which or on which further longitudinal carriers suspension strut mounts for front wheels of the electric vehicle are fastened or configured.

5. The electric vehicle as claimed in claim 1, wherein, as viewed in a longitudinal direction of the electric vehicle, the rear crossmember of the floor assembly extends adjacently with respect to at least one of rear wheel arches or a C-pillar, and wherein the floor assembly further comprises a trunk floor extending toward a rear of the electric vehicle, as viewed from the rear crossmember.

6. The electric vehicle as claimed in claim 1, wherein the lateral longitudinal carriers of the floor assembly are configured as side sills.

7. The electric vehicle as claimed in claim 1, wherein the traction battery has a battery frame and battery cells which are recessed from the battery frame, the battery frame being mounted on the lateral longitudinal carriers and on the front and rear crossmembers, and being sealed circumferentially.

8. The electric vehicle as claimed in claim 1, wherein a service flap is positioned in the passenger compartment floor, via which service flap the technical space is accessible.

9. The electric vehicle as claimed in claim 1, wherein at least one aperture is located in the rear crossmember of the floor assembly, via which aperture lines are routed from the technical space to one or more of the least one electric machine which is configured to drive rear wheels of the electric vehicle.

* * * * *